United States Patent [19]

Hartman et al.

[11] 4,029,621

[45] June 14, 1977

[54] REACTION PRODUCTS OF A POLYEPOXIDE WITH A THIOL HAVING A GROUP HYDROYZABLE TO CARBOXYL, AND AQUEOUS SOLUBILIZED PRODUCTS

[75] Inventors: Marvis E. Hartman, Pittsburgh; Thomas R. Hockswender, Gibsonia; Rostyslaw Dowbenko, Gibsonia; Roger M. Christenson, Gibsonia, all of Pa.

[73] Assignee: PPG Industries, Inc., Pittsburgh, Pa.

[22] Filed: Apr. 28, 1976

[21] Appl. No.: 680,935

Related U.S. Application Data

[63] Continuation-in-part of Ser. No. 602,858, Aug. 7, 1975, abandoned.

[52] U.S. Cl. .................... 260/29.2 EP; 260/293; 260/29.4 R; 260/29.4 UA; 260/29.6 NR; 260/47 EC; 260/836; 260/837 R
[51] Int. Cl.² ................ C08G 59/16; C08G 59/66
[58] Field of Search .............. 526/30; 260/29.2 EP, 260/47 EC, 29.6 NR, 29.3, 29.4

[56] References Cited

UNITED STATES PATENTS

| | | | |
|---|---|---|---|
| 3,410,773 | 11/1968 | Hagan et al. | 204/181 |
| 3,625,684 | 12/1971 | Poot et al. | 260/29.2 EP |
| 3,703,352 | 11/1972 | Dobinson et al. | 8/128 A |
| 3,793,278 | 2/1974 | De Bona | 260/29.2 EP |
| 3,935,087 | 1/1976 | Jerabek et al. | 260/29.2 EP |
| 3,960,795 | 6/1976 | Dowbenko et al. | 260/29.2 EP |

*Primary Examiner*—Murray Tillman
*Assistant Examiner*—A. H. Koeckert
*Attorney, Agent, or Firm*—Frank J. Troy

[57] ABSTRACT

Aqueous coating compositions which may be applied by conventional coating techniques as well as by electrodeposition are provided by reacting an epoxy-containing organic material with a compound containing a mercaptan group and at least one group hydrolyzable to a carboxyl group. Examples of such hydrolyzable groups include ester groups, amide groups and nitrile groups. The resultant product is then hydrolyzed and solubilized using hydrolyzing agents such as aqueous alkali metal hydroxides and aqueous solutions of various amines.

32 Claims, No Drawings

4,029,621

REACTION PRODUCTS OF A POLYEPOXIDE WITH A THIOL HAVING A GROUP HYDROYZABLE TO CARBOXYL, AND AQUEOUS SOLUBILIZED PRODUCTS

CROSS REFERENCE TO RELATED APPLICATIONS

This application is a continuation-in-part of our co-pending application Ser. No. 602,858, filed Aug. 7, 1975, now abandoned.

BACKGROUND OF THE INVENTION

As a result of the increased emphasis by Federal and State governments in combating air pollution, the coatings industry is expending considerable effort in eliminating or at least substantially minimizing the emission of solvent vapors to the atmosphere from coating compositions. As a part of this effort, the coatings industry has launched a major effort to develop aqueous or water-based coating compositions in which organic solvents have been completely eliminated or in which the organic solvents constitute only a very minor proportion of the total liquid medium.

In view of the excellent properties of solvent-based epoxy coating compositions for various coating applications, those in the coatings art have been extremely interested in developing aqueous coating compositions derived from epoxy resins. Prior efforts to develop such compositions involved reacting hydroxy carboxylic acids and epoxy compounds. However, in reacting such compounds, two types of reaction may result due to the chemical nature of the materials used. The hydroxyl group of the hydroxy acid may react with the epoxide groups to form ether linkages, or the carboxyl group or groups of the acid may react with the epoxide to form ester groups. Both reactions may occur in an uncontrolled reaction to yield products having mixed ether or ester linkages to a non-predetermined degree. Such reaction with the epoxides and acids previously employed have not been tolerable since the ultimate products have not generally been suitable for any practical purpose.

In an attempt to overcome these problems, the art has attempted to optimize the etherification portion of the reaction while minimizing the esterification portion of the reaction (See, e.g., U.S. Pat. Nos. 3,404,018 and 3,410,773). Similarly, the art has attempted to utilize products containing both ester and ether linkages (See, e.g., U.S. Pat. Nos. 3,707,526 and 3,792,112). The compositions produced using the above techniques suffer from certain disadvantages, including poor cured film saponification resistance, low hydrolysis resistance, and lack of adequate package stability.

SUMMARY OF THE INVENTION

It has now been found that highly useful coating compositions suitable for many coating applications, including electrodeposition, can be prepared by reacting an epoxy-containing organic material with a compound containing a mercaptan group and at least one group hydrolyzable to a carboxyl group. Examples of such hydrolyzable groups include ester, amide and nitrile groups. The resultant composition effectively contains groups which upon hydrolysis will provide the composition with carboxyl functionality to be used for subsequent solubilization. As is recognized in the art, suitable solubilizing agents include the amines such as alkylamines, alkanolamines and the like, ammonia, and various hydroxides such as potassium hydroxide, sodium hydroxide and the like. In most instances, it is desirable to hydrolyze and solubilize the reaction product in one step by utilizing an aqueous solution of the amines or hydroxides.

When used in electrodeposition, the compositions herein deposit on the anode. The resultant appropriately crosslinked films, as well as those applied by conventional coating techniques, are characterized by increased cured film saponification resistance, improved hydrolytic stability, improved salt spray resistance and good hardness. Additionally, these compositions have excellent package stability. Since the reaction products contain hydroxyl functionality, a wide variety of conventional crosslinking agents can be employed in formulations with these new resins.

The reaction products disclosed herein can also be provided with a wide variety of physical properties, such as flexibility, by reacting therewith prior to hydrolysis, active hydrogen-containing polymers such as polyamides, polymeric polyols, polymercaptans, and the like. Moreover, highly useful products can be obtained when the reaction products of the instant invention are blended with paint vehicles, such as lattices, water-soluble acrylics, high molecular weight acrylic polymer emulsions and the like.

DESCRIPTION OF THE INVENTION

As hereinbefore set forth, the compositions of the instant invention are produced by reacting an epoxy-containing organic material with a compound containing a mercaptan group and containing at least one group hydrolyzable to a carboxyl group.

The epoxy group-containing organic material can be any monomeric or polymeric compound or mixture of compounds having a 1,2-epoxy group. It is preferred that the epoxy-containing material have a 1,2-epoxy equivalency greater than 1.0, that is, in which the average number of 1,2-epoxy groups per molecule is greater than 1.0. It is preferred that the epoxy compound be resinous, that is, a polyepoxide, i.e., containing more than one epoxy group per molecule. The polyepoxide can be any of the well-known epoxides. Examples of these polyepoxides have, for example, been described in U.S. Pat. Nos. 2,467,171; 2,615,007; 2,716,123; 3,030,336; 3,053,855 and 3,075,999.

A preferred class of polyepoxides are the polyglycidyl ethers of polyphenols, such as Bisphenol A. These may be produced, for example, by etherification of a polyphenol with epichlorohydrin or dichlorohydrin in the presence of an alkali. The phenolic compound may be 1,1-bis(4-hydroxyphenyl)ethane, 1,1-bis(4-hydroxyphenyl)isobutane, 2,2-bis(4-hydroxytertiarybutylphenyl)propane; bis(2-hydroxynaphthyl)methane; 1,5-dihydroxynaphthalene; 1,1-bis(4-hydroxy-3-allylphenyl)ethane, or the like. Another quite useful class of polyepoxides are produced similarly from Novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, 2,2-bis(4-hydroxycyclohexyl)propane, and the like.

Another useful class of polyepoxides are those containing oxyalkylene groups in the epoxy molecule. Such oxyalkylene groups are typically groups of the general formula:

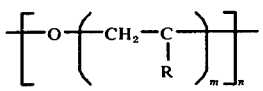

where R is hydrogen or alkyl, preferably lower alkyl (e.g., having 1 to 6 carbon atoms) and where, in most instances, $m$ is 1 to 4 and $n$ is 2 to 50. Such groups can be pendant to the main molecular chain of the polyepoxide or part of the main chain itself. The proportion of oxyalkylene groups in the polyepoxide depends upon many factors, including the chain length of the oxyalkylene group, the nature of the epoxy and the degree of water solubility desired. As is recognized in the art, such epoxy material can be produced, for example, by reacting an epoxy-containing material with an alkylene oxide.

The compositions of the instant invention are produced by reacting the epoxy material with a compound containing a mercaptan group and at least one group hydrolyzable to a carboxyl group. Compounds which may be reacted with the epoxy material are represented by the general formula:

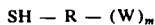

wherein $m$ may be an integer of from 1 to 5 and wherein R is an organic radical having from 1 to 10 carbon atoms. W in the above formula is a group hydrolyzable to a hydroxyl group and may be selected from the group consisting of —COOR', —CON(R")$_2$ and —CN, wherein R' is an alkyl group of from 1 to 10 carbon atoms and R" is selected from the group consisting of hydrogen, lower alkyl and mixtures thereof.

Illustrative of the compounds represented by the above structural formula in which W is an ester group (i.e., —COOR) are the alkyl esters of mercaptoacetic acid (i.e., thioglycolic acid) or alpha and beta-mercaptopropionic acids, such as, for example, ethyl thioglycolate, n-butyl thioglycolate, isobutyl thioglycolate, isooctyl thioglycolate, isooctyl mercaptopropionate, ethyl thiolactate, and the like.

Illustrative of compounds represented by the above structural formula in which W is the nitrile group (i.e., —CN) or the amide group [—CON(R")$_2$] are, for example, mercaptoacetonitrile, 3-mercaptopropionitrile, 4-mercaptobutyronitrile, and the like, mercaptoacetamide, 3-mercaptopropionamide, 4-mercaptobutyramide and the like. It should be noted that the nitrile group or amide group-containing mercaptan compounds may not be readily available commercially or in some instances may present difficulty in their preparation. Accordingly, such compounds are less preferred than the ester-containing mercaptan compounds. Nevertheless such compounds, where they exist or are capable of preparation, are contemplated as being within the scope of this invention.

As is apparent from the above discussion, the preferred compounds for reaction with the epoxy materials herein are the ester-containing mercaptan compounds. Thus, preferred compounds are represented by the general formula:

wherein $m$ is as above, R is an organic radical having from 1 to 10 carbon atoms, and R' is an alkyl group of from 1 to 10 carbon atoms. Particularly preferred compounds represented by this structural formula are the alkyl esters of mercapto acids as previously described above. Especially preferred compounds of this type are the alkyl esters of mercaptoacetic acid.

While, as indicated, the preferred compounds are the ester-containing mercaptan compounds, it will be recognized that essentially any compound containing a mercaptan group and at least one group hydrolyzable to a carboxyl group can be used in the instant invention.

In general, the equivalent ratio of epoxy groups contained in the polyepoxide to mercaptan groups contained in the hydrolyzable group-containing compound should be between about 1.0 to 0.25 and 1.0 to 1.25, and preferably 1 to 0.5 and 1.0 to 1.0. It is generally preferred that the carboxyl content of the reaction product be at least equivalent to an acid value of at least about 20 when in an unneutralized state.

In reacting the epoxy-containing organic material and the hydrolyzable group-containing, mercaptan-containing material, a catalyst may be used if desired. Suitable catalysts include benzyldimethylamine, benzyltrimethylammonium hydroxide, ethyltriphenylphosphonium iodide, triethylamine, as well as various other tertiary amines known in the art, and Lewis acid type catalysts such as zinc chloride, boron trifluoride, hydrogen chloride, and the like. In general, where catalysts are employed, they should be used in amounts from 0.01 to 3.0 percent by weight based on the total weight of the epoxy-containing material and the hydrolyzable group-containing, mercaptan-containing material. Usually, it is desirable to react the components at elevated temperatures, and for this purpose, temperatures of from 60° C. to 225° C. are generally acceptable. Of course, it is to be recognized that the reaction temperature can be varied between about the lowest temperature at which the reaction reasonably proceeds and the temperatures indicated above.

A solvent is not necessary, although one is often used in order to afford better control of the reaction. The solvent used preferably should be a non-epoxy reactive solvent and, for that reason, useful solvents include methylbutyl ketone, dioxane, the monoalkyl ethers of ethylene glycol (known as Cellosolves), xylene, toluene, and the like. If desired, a coupling solvent can be added for improved deposited film appearance. These solvents include hydrocarbons, alcohols, esters, ethers and ketones. Specific coupling solvents include isopropyl alcohol, butanol, isophorone, Pentoxone (4-methoxy-4-methyl-2-pentanone), ethylene and propylene glycol, the monoalkyl ethers of ethylene glycol, and 2-ethylhexanol. In general, the coupling solvent, when used is added after the reaction between the epoxy and the hydrolyzable group-containing, mercaptan-containing material is complete.

The reaction between the epoxy-containing material and the hydrolyzable group-containing mercaptan-containing material yields a product effectively containing groups which upon hydrolysis and solubilization yield solubilized products. The reactions involved are believed to proceed as follows:

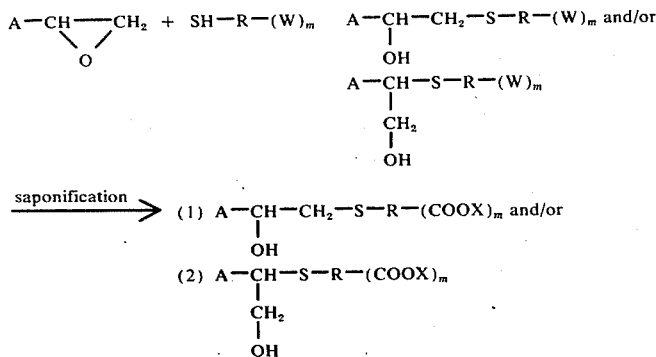

In the above reaction, A represents the organic radical portion of a polyepoxide, R is as defined above and X can be hydrogen or a moiety formed by reacting the carboxylic group with compounds selected from the group consisting of alkali metal hydroxides, ammonia, amines or quaternary ammonium compounds. As indicated by the above reaction, the products produced by the reaction may constitute a single product having the structure designated (1) or (2) or a mixture of products having these structures. It will be further noted that the product designated (2) represents an isomer of the product designated (1).

The term "solubilize" or "solubilized" (e.g., "solubilized reaction product") as employed throughout this specification and in the claims includes both the process of hydrolyzing to form the carboxyl group and the reaction of the carboxyl group with a base (i.e., neutralization or partial neutralization) to form the salt or partial salt of the product.

The solubilization process can be carried out in either a stepwise sequence or as is preferred in a simultaneous or one step reaction. Thus, the compositions of the invention can be solubilized in stepwise sequence by first hydrolyzing the reaction product to form the carboxyl group such as, for example, by heating this product to a suitable temperature in the presence of high pressure steam and then subsequently neutralizing or partially-neutralizing the carboxyl group with a suitable base (e.g., an amine) to form the salt or partial salt of the product. In the preferred method, the compositions of the invention are solubilized in a one-step or simultaneous reaction by saponifying the reaction product in the presence of an aqueous base solution.

Suitable solubilizing agents include inorganic bases such as alkali metal hydroxides, as well as organic bases such as ammonia, amines, or quaternary ammonium compounds. Among the amines which may be used are alkylamines, such as ethylamine, propylamine, dimethylamine, dibutylamine, cyclohexylamine, and the like; allylamine, alkanolamines, such as ethanolamines and the like; aralkylamines, such as benzylamine; alkarylamines, such as m-toluidine; cyclic amines, such as morpholine and piperidine; diamines such as hydrazine, ethylene diamine, and the like. Mixtures of solubilizing agents may also be used. The solubilization reaction can be accomplished by mixing the solubilizing base with the hydrolyzed reaction product. Most preferably, however, an aqueous solution of the base is used and such aqueous solution is blended with the unhydrolyzed product. If desired, moderately elevated temperatures may be employed. Essentially any amount of solubilizing agent may be used as long as the desired degree of water solubility is obtained. In general, the amount of solubilizing agent will be dependent upon both the acid value and the amount of ester groups in the reaction product. It is preferable to react one equivalent of solubilizing agent per equivalent ester group, although higher and lower amounts may be used. It is generally preferred to utilize the minimum amount of solubilizing agent necessary to obtain the solubilized product.

In some instances it has been found that the hydrolysis and solubilization of the reaction products disclosed herein using an aqueous amine solution is a slow reaction. It has also been found that the solubilization reaction using an aqueous amine solution does not always result in a fully saponified product. It is accordingly desirable in some instances to first solubilize the product using an aqueous alkali metal hydroxide solution, e.g., sodium or potassium hydroxide. The resultant solubilized product is then reacted with an acid, such as phosphoric acid or sulfuric acid. The resultant product then contains carboxyl groups and the salt formed is precipitated and filtered off. The carboxyl containing product may then be readily solubilized by reaction with an amine.

As indicated heretofore, this invention is principally concerned with aqueous compositions which are formulated from the above described reaction products. However, in certain cases, solvent-based coating compositions containing these reaction products may be valuable for certain applications and such compositions are considered to be within the scope of this invention. When it is desired to prepare solvent-based compositions utilizing these reaction products, this can readily be accomplished by dissolving or dispersing the reaction products in conventional organic solvents which are well known to those in the coatings art. Thus, nonepoxy reactive organic solvents such as the hydrocarbons, alkanols, esters, ethers, and ketones described above may be employed for that purpose. In some instances, it may be desirable to prepare coating compositions from the reaction products herein in which the liquid medium is a mixture of water and organic solvents. This can be conveniently accomplished by utilizing a water-miscible or dispersible organic solvent such as for example, an ether alcohol (e.g., a monoalkyl ether of ethylene glycol) or a lower alkanol (e.g., ethanol, isopropyl alcohol, n-butanol, etc.).

As hereinbefore indicated, the physical properties of the reaction products herein may be altered by reacting therewith an active hydrogen-containing material such as amines, alcohols, mercaptans, etc. The epoxy-containing organic material and the hydrolyzable group-containing, mercaptan-containing material may first be reacted in amounts such that the reaction product contains residual epoxy groups. The reaction product is then reacted with an active hydrogen-containing material, such as polyamines, polymeric polyols, polymer-captans and the like. In choosing active hydrogen materials to be used, care should be taken to avoid the use of highly functional materials which may cause gelation of the product. It is accordingly generally preferred to utilize difunctional active hydrogen-containing materials. Higher functional materials may be used in which case it is preferred that sufficient mono- and difunctional materials be used therewith in amounts such that the average functionality of the mixture is two.

Where active hydrogen-containing materials are used, they may be reacted with the reaction products herein in a variety of different ways. For example, the active hydrogen-containing material may first be reacted with the epoxy-containing material in amounts such that the product thereof contains residual epoxy groups. The resultant product may then be reacted with the hydrolyzable group-containing mercaptan-containing material and subsequently hydrolyzed and solubilized. Alternatively, as indicated above, the mercaptan-containing material and the epoxy may first be reacted. Subsequently, the active hydrogen-containing material may be reacted therewith and the product subsequently hydrolyzed and solubilized. Finally, the mercaptan-containing material may be blended and reacted, with the resultant product subsequently hydrolyzed and solubilized. Where the reaction product is reacted or formed with an active hydrogen-containing material, the amounts of reactants may be varied over a wide range, depending upon the equivalent weights of either or both the epoxy compound and/or the hydrolyzable group-containing compound.

While the products hereinabove described may be used as the sole resinous component of the coating composition, it is frequently desirable in order to improve or modify film appearance and/or film properties, to incorporate into the composition various non-reactive and reactive compounds or resinous materials, including phenol resins such as allyl ether-containing phenolic resins; triazine resins such as melamine-based resins and benzoguanamine-based resins, especially alkylated formaldehyde reaction products thereof; urea-formaldehyde resins, hydrocarbon resins, acrylic resins, acrylic polymer latices, high molecular weight acrylic polymer latices, blocked or semi-blocked polyisocyanates, or combinations thereof. The reaction product herein may also be blended with polyesters, polyamides, and the like. When using such modifying materials, such materials generally comprise from 90 to 10 percent by weight, and preferably from 60 to 30 percent by weight, based on total resinous solids, with the balance being the reaction products disclosed herein.

A suitable high molecular weight acrylic polymer latex which may be employed in conjunction with these reaction products is a copolymerized latex product prepared by conventional emulsion polymerization in aqueous medium of vinyl and equivalently-reactive unsaturated monomers described hereinafter.

A class of unsaturated monomeric materials which may be used in preparing the high molecular weight acrylic polymers herein are esters of organic acids having terminal methylene groups and which constitute from 35 to 100, preferably 35 to 85 percent by weight of the total monomer charge. Examples of such esters include 4–15 carbon alkyl acrylates and 5–15 carbon alkyl methacrylates which are the preferred esters. Specific examples of suitable unsaturated monomers of this type include methyl methacrylate, ethyl methacrylate, propyl methacrylate, butyl methacrylate, amyl methacrylate, hexyl methacrylate, heptyl methacrylate, octyl methacrylate, decyl methacrylate, methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, decyl acrylate, dodecyl acrylate and the like. Examples of other unsaturated esters containing terminal methylene groups which may also be employed are the vinyl esters such as: vinyl acetate, vinyl propionate, vinyl butyrate, vinyl isobutyrate, vinyl valerate, vinyl caproate, vinyl enanthate, vinyl benzoate, vinyl toluate, vinyl-para-chlorobenzoate, vinyl-ortho-chlorobenzoate, and similar vinyl halobenzoates. Usually, when these latter mentioned vinyl esters are employed, they are used in combination with the preferred acrylates and methacrylates.

A second class of materials which can be used in preparing the high molecular weight acrylic polymer latex are unsaturated carboxylic acids which constitute from about 0 to 10 and preferably 2 to 5 percent by weight of the monomer charge used in preparing the acrylic polymer. Examples of unsaturated carboxylic acids are those containing up to 10 carbon atoms such as acrylic acid and alkyl-substituted acrylic acid wherein the alkyl substituents constitute from 1 to 7 carbon atoms and may be aliphatic or cycloaliphatic in nature. Examples of suitable alkyl-substituted acrylic acids are methacrylic acid and ethacrylic acid. Examples of other suitable unsaturated acids which are not as preferred as the acrylic and substituted acrylic acids are unsaturated acids such as crotonic acid, maleic acid or its anhydride, fumaric acid or itaconic acid. Usually when these latter acids are used, they are employed in combination with the acrylic or methacrylic acids.

A third class of unsaturated monomeric materials which can be employed in preparing the high molecular weight acrylic polymer latex are copolymerizable monomeric materials containing a $CH_2=C<$ group in the terminal position other than the acids and esters mentioned above, and which constitute from 0 to 60, preferably 10 to 60 percent by weight of the monomer charge used in preparing the acrylic polymer. Examples of these materials include styrene, alpha-methylstyrene, alpha-chlorostyrene, allyl chloride, methyl-alpha-chloroacrylate, methyl-alpha-cyanoacrylate, dimethyl maleate, acrylonitrile, acrylamide, N,N-dimethyl acrylamide, vinyl toluene and divinyl benzene.

The high molecular weight acrylic polymer lattices can be made utilizing conventional emulsion or dispersion polymerization techniques by dispersing in water the polymerizable carboxylic acid and the copolymerizable esters or monomers or at least a portion of them. The selected materials are dispersed to the desired monomer solids content by using surface-active water-soluble anionic or non-ionic dispersing agents. Also, mixtures of anionic and non-ionic dispersing agents may be used.

Various anionic or non-ionic dispersing agents conventionally employed in emulsion polymerization processes may be utilized. Examples of anionic emulsifiers that may be used include ordinary soaps such as the alkali metal, ammonium and alkanol amine salts of fatty acids including sodium oleate, potassium palmitate, ammonium stearate, ethanolamine laurate and the like. Also, the synthetic saponaceous materials including the higher aliphatic sulfates and sulfonates such as sodium lauryl sulfate which is preferred and sodium cetyl sulfate may be employed.

Suitable non-ionic emulsifying and dispersion agents include alkylphenoxypolyethoxyethanols having alkyl groups of about 7 to 18 carbon atoms and 6 to 60 or more oxyethylene units, such as heptylphenoxypolyethoxyethanols, octylphenoxypolyethoxyethanols, nonylphenoxypolyethoxyethanols and dodecylphenoxypolyethoxyethanols; sulfur-containing agents such as those made by condensing 6 to 60 or more moles of ethylene oxide with nonyl, dodecyl, tetradecyl, t-dodecyl and the like, mercaptans or with alkyl thiophenols having alkyl groups of from 6 to 15 carbon atoms; ethylene oxide derivatives of long-chain carboxylic acids such as lauric, myristic, palmitic, oleic; analogous ethylene oxide condensates of long-chain alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units; also ethylene oxide condensates of long-chain or branch-chain amines such as dodecylamine, hexadecylamine and octadecylamine, containing 6 to 60 oxyethylene groups, block copolymers of ethylene oxide and propylene oxide comprising a hydrophobic propylene oxide section combined with one or more hydrophilic ethylene oxide sections. Also, mixtures of non-ionic emulsifiers may be used.

The amount of emulsifier or emulsifiers required varies primarily with the concentration of monomers in the aqeuous medium and to an extent with a choice of emulsifiers, monomers and proportions of monomer. Generally, the amount of emulsifying agent is between 0.5 and 12 percent by weight of the mixture of monomers and is preferably 0.5 to 4 percent of this weight; the percentage by weight being based on total monomer weight.

Preferably, a fractional part of the monomer mixture is emulsified in the aqueous medium and a free radical polymerizing catalyst added to the emulsion. The catalyst alone can be of the peroxide type and if the redox conditions are desired, then reducing actuators or agents and/or metal promoters can be included. The polymerization is then effected, preferably by gradually adding the residue of the monomer mixture at a rate which enables the operator to control and to keep the temperature of the mass within his selected operating range.

As the polymerization catalyst, there may be used one or more peroxides which are to act as free radical catalysts and which are soluble in the aqueous medium. Examples include the persulfates, such as ammonium, sodium and potassium persulfates. Also, oil-soluble catalysts may be employed either alone or in addition to the water-soluble catalysts. Typical oil-soluble catalyst include organic peroxides, such as benzoyl peroxide, tertiary-butyl hydroperoxide, cumene peroxide, tetralin peroxide, acetyl peroxide, caproyl peroxide, tertiary-butyl perbenzoate, tertiary-butyl diperphthalate and methyl ethyl ketone peroxide. The preferred organic peroxides have at least partial solubility in the aqueous medium containing the emulsifying agent. The choice of inorganic or organic peroxide catalyst depends in part upon the particular combination of monomers to be interpolymerized, some of these responding better to one type than another.

The amount of peroxide catalyst required is roughly proportional to the concentration of the mixture of monomers. The usual range is 0.01 to 3, preferably 0.05 to 1 percent of the catalyst based on the weight of the monomer mixture. The optimum amount of catalyst is determined in large part by the nature of the particular monomer selected including impurities which accompany particular monomers.

In order to effect interpolymerization at a temperature below that at which coagulation might occur, it is sometimes desirable to use a so-called redox system in which a reducing agent is present in addition to a peroxide catalyst. A redox system can be used advantageously to secure improved physical and/or chemical characteristics in the resulting polymer, to secure higher molecular weight, to promote interpolymerization and to reduce coagulum which sometimes is produced when using non-ionic or other surfactants at high temperature. Many examples of such systems are known. Agents such as hydrazine or soluble sulfite, including hydrosulfites, sulfoxylates, thiosulfates, sulfites, and bisulfites can be used. Examples of these are sodium hydrosulfite, sodium metabisulfite, potassium sulfite, zinc formaldehyde-sulfoxylate, and calcium bisulfite. Redox systems may be activated by the presence of small amounts of polyvalent metal ions. Ferrous ions are commonly and effectively thus used for example, ferrous sulfate. The peroxide catalyst can also be activated by the presence of a tertiary amine which is soluble in the reaction medium such as dimethylethanolamine or triethanolamine. Also, mixtures of activators may be used.

The amount of coinitiator used varies somewhat with the choice of peroxide initiator, choice of emulsifying agent, and with the particular unsaturated monomers involved. Usually, an amount within the range of about 0.05 to 3 percent by weight of coinitiator based on weight of the mixture of monomers will be sufficient.

Copolymerization is usually conducted at temperatures below about 80° C., preferably within the range of 20° to 70° C. although slightly lower and somewhat higher temperatures are permissible. During polymerization, the temperature can be controlled in part through the rate at which monomers are supplied and polymerized and/or through applied cooling.

The polymerization process can be carried out batchwise or continuously. It is possible to work entirely batchwise, emulsifying the entire charge of monomers and proceeding with polymerization. It is usually advantageous, however, to start with part of the monomers which are to be used and add more monomers as polymerization proceeds. An advantage of gradual addition of monomers lies in reaching a high solids content with optimum control and with maximum uniformity of product. Additional catalyst or additional components of the redox system may also be added as polymerization proceeds.

With the attainment of desired polymer content in good yield, the latex is preferably rendered mildly alkaline by adding ammonia or a water-soluble amine such as morpholine or diethylamine.

In some instances, it may be desired to make an adjustment of the viscosity of the alkaline latex by adding a small amount (0.1 to 5 percent) of a thickening agent such as methyl cellulose, hydroxyethylcellulose. In this way, compensation can be made for possible minor variations in viscosity or latex stability from batch to batch suspensions.

As mentioned above, the acrylic-type monomers are emulsion polymerized in aqueous medium to a high molecular weight product. The molecular weight of the final polymer latex product is at least about 100,000 and usually within the range of about 750,000 to 2,000,000 on a weight average basis as determined by Gel Permeation Chromatography. Usually the solids content of the high molecular weight acrylic polymer latex is within the range of about 30 to 50 percent. By "solids content" is meant the weight of the polymeric product based on total weight of the aqueous latex.

The acrylic polymer as described above is a waterborne, aqueous latex as distinguished from an aqueous solution or aqueous dispersion. An aqueous solution would appear to be optically clear and would not have a polymer particle size to scatter light. An aqueous dispersion, on the other hand, would scatter light and would have a polymer particle size of about 0.01 to 0.09 microns. The aqueous lattices employed in the practice of the present invention have micelle particle sizes on the order of 0.1 to 1.0 microns.

The compositions herein may contain from about 20 to about 80, preferably 20 to about 50 percent, by weight of the high molecular weight acrylic latex polymer and from about 20 to about 80, preferably 50 to 80 percent by weight of the reaction products described above; percentages by weight are based on total weight solids of the high molecular weight acrylic polymer and the reaction product.

It is generally preferred that the reaction products described herein be combined with a suitable curing or crosslinking agent. Such materials, as noted above, include aminoplast resins, phenolic resins and blocked or semi-blocked polyisocyanates.

The aminoplast resins used may be alkylated methylol melamine resins, alkylated methlol urea, and similar compounds. Products obtained from the reaction of alcohols and formaldehyde with melamine, urea or benzoguanamine are most common and are preferred herein. However, condensation products of other amines and amides can also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzylurea, dicyandimide, formoguanamine, acetoguanamine, ammeline, 2-chloro-4,6-diamino-1,3,5-triazine, 6-methyl-2,4-diamino-1,3,5-triazine, 3,5-diamino triazole, triaminopyrimidine, 2-mercapto-4,6-diaminopyridine, and the like.

While the aldehyde employed is most often formaldehyde, other similar condensation products can be made from other aldehydes or mixtures thereof, such as acetaldehyde, crotonaldehyde, acrolein, benzaldehyde, furfural, glyoxal and the like.

The aminoplast resins contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohols such as cyclohexanol, monoethers of glycols such as Cellosolves and Caritols, and halogen-substituted or other substituted alcohols, such as 3-chloropropanol and butoxyethanol. The preferred aminoplast resins are substantially etherified with methanol or butanol.

The phenolic resins which may be used as curing agents herein are formed by the condensation of an aldehyde and a phenol. The most used aldehyde is formaldehyde, although other aldehydes, such as acetaldehyde, can also be employed. Aldehyde-releasing agents such as paraformaldehyde and hexamethylenetetramine, can be utilized as the aldehyde agent if desired. Various phenols can be used; for instance, the phenol employed can be phenol per se, a cresol, or a substituted phenol in which a hydrocarbon radical having either a straight chain, a branched chain or a cyclic structure is substituted for a hydrogen in the aromatic ring. Mixtures of phenols are also often employed. Some specific examples of phenols utilized to produce these resins include p-phenylphenol, p-tert-butylphenol, p-tert-amylphenol, cyclopentylphenol and unsaturated hydrocarbon-substituted phenols, such as the monobutenyl phenols containing a butenyl group in the ortho, meta, or para position, and where the double bond occurs in various positions in the hydrocarbon chain. A common phenolic resin is phenol formaldehyde resin.

Any blocked or semi-blocked organic polyisocyanate may be used as the curing agent herein. The organic polyisocyanates are blocked with a volatile alcohol, $\epsilon$-caprolactam, ketoximes, or the like, and will unblock at elevated temperatures. These curing agents are well-known in the art.

The curing or crosslinking agents described can be combined with the reaction products in widely varying amounts, but are generally used in amounts ranging from 90 to 10 and preferably 60 to 30 percent by weight, based on total resinous solids.

In addition to the components above, the compositions ordinarily contain other optional ingredients, including any of the pigments ordinarily used in coating compositions of this general class. In addition, various fillers, antioxidants, flow control agents, surfactants, and other such formulating additives may be employed.

The compositions herein can be applied by essentially any coating method, including brushing, spraying, dipping, flow coating and electrodeposition. When used in electrodeposition, the compositions will deposit the anode. The compositions may be applied over virtually any substrate, including wood, metals, glass, cloth, plastics, foams, and the like, as well as over various primers.

The invention will be further described in connection with several examples which follow. These examples are given as illustrative of the invention and are not to be construed as limiting it to their details. All parts and percentages in the examples and throughout the specification are by weight unless otherwise indicated.

The following Examples (EXAMPLES A through I) illustrate the production of various types of saponified reaction products.

EXAMPLE A

Into a reactor equipped with heating means, stirrer, thermometer, reflux condenser, and nitrogen inlet was charged 200 parts of Epon 829 (a polyglycidyl ether of Bisphenol A, available from Shell Chemical Company, having an epoxide equivalent of about 195) and 90 parts by weight of ethyl thioglycolate. Upon stirring and heating to 150° C. an exothermic reaction occurred in which the temperature reached 208° C. After cooling the reaction mixture back to 150° C., a sample was removed for testing. The sample was treated with water and aqueous potassium hydroxide to saponify the ester group. The resultant resin product was water reducible. The remaining resin in the reactor was found to have a solids content of 92 percent and an epoxy equivalent of 1400.

EXAMPLE B

To a reactor equipped as in Example A was charged 2500 parts of Epon 1001 (a polyglycidyl ether of Bisphenol A, available from Shell Chemical Company, having an epoxide equivalent of about 500) 450 parts of ethyl thioglycolate and 3 parts of ethyl triphenyl phosphonium iodide. Upon heating and stirring this mixture, an exothermic reaction occurred reaching a peak temperature of 208° C. After cooling to 163° C. over a period of 50 minutes a sample of the resin product in the reactor was removed for testing. The product was saponified with water and a 50 percent aqueous potassium hydroxide solution. The resultant product was soluble in water. After this test, 1833 parts of ethylene glycol monoethyl ether was added to the reactor to give a final product having a solids content of 76.2 percent.

EXAMPLE C

To a reactor equipped as in Example A were charged 2130 parts of Epon 829, 870 parts of Bisphenol A and 400 parts of ethyl thioglycolate. This mixture was heated to 180° C. for 1 hour, cooled to 155°–160° C. and held for 4 hours. The mixture was then gradually cooled and while cooling to below 100° C. 850 parts of ethylene glycol monoethyl ether were added followed by 145 parts of a 50 percent aqueous potassium hydroxide solution. The resultant resin product was water-reducible. Following this addition, 607 parts of additional ethylene glycol monoethyl ether (hereinafter ethyl Cellosolve) were added to give a final product having a solids content of 62.8 percent.

EXAMPLE D

Into a reactor equipped as in Example A was charged 2130 parts of Epon 829, 870 parts of Bisphenol A and 680 parts of isooctyl thioglycolate. The mixture was heated at 165° C. to 180° C. for 4.5 hours, after which 850 parts of ethyl Cellosolve were added while cooling to 85° C. Following this addition, 188 parts of a 50 percent aqueous potassium hydroxide solution were added and the mixture held for 1 hour. The resultant resin product was water reducible (i.e., soluble) and had a solids content of 67.4 percent.

EXAMPLE E

To a reactor equipped as in Example A was charged 1920 parts of Epon 829, 580 parts of Bisphenol A, 630 parts of isooctyl thioglycolate and 20 parts of dimethylbenzylamine. After heating at 175°–180° C. for 4 hours, 780 parts of ethyl Cellosolve were added, followed by 175 parts of a 50 percent aqueous potassium hydroxide solution. The resultant product was water-reducible (i.e., soluble) and had a solids content of 67.3 percent.

EXAMPLE F

To a reactor equipped as in Example A was charged 1152 parts of Epon 829, 348 parts of Bisphenol A and 324 parts of isooctyl thioglycolate. The mixture was heated to 180° C. for 3 hours. The mixture was then cooled to 165° C. while sparging with nitrogen. At this point, 1216 parts of ethyl Cellosolve were added to the reaction mixture. After cooling the reaction mixture to 85° C., 178 parts of a 50 percent aqueous potassium hydroxide solution were added. The mixture was held for one hour and allowed to cool. At 79° C., 183 parts of 85 percent phosphoric acid were added with stirring. Stirring was continued for one hour and then the mixture was filtered. To this filtrate, 106 parts of dimethylethanolamine were added. The resultant amine-solubilized product had a solids content of 46.7 percent and a Gardner-Holdt viscosity of X-Y.

EXAMPLE G

Into a reactor equipped as in Example A was charged 250 parts of Epon 1001 and 0.3 parts of ethyl triphenyl phosphonium iodide. The mixture was heated to 130° C. over a period of about 40 minutes. Then 56.0 parts of n-butyl thioglycolate were added to the reaction mixture. After heating for four hours at 130°–140° C., a sample of the reaction product after saponification with potassium hydroxide and water was found to be water-reducible.

EXAMPLE H

The procedure of Example G was repeated except that 81.5 parts of isooctyl mercaptopropionate was used in place of the n-butyl thioglycolate and the reaction time extended to 5 hours. The resultant product treated with water and potassium hydroxide was water-reducible.

EXAMPLE I

Into a reactor equipped as in Example A was charged 200 parts of Epon 829 and 90 parts ethyl thioglycolate. Upon heating an exothermic reaction occurred which reached a peak temperature of 230° C. The mixture was then cooled and held for 2 hours at 75°–95° C. At this time, 32 parts of ethyl Cellosolve were added. The resultant resin product solution had a solids content of 84.7 percent. Two hundred parts of this resin product solution were charged into a reactor equipped as in Example A and heated to 85° C. To this product was added 42 parts of dimethylethanolamine and 50 parts of deionized water. The resultant mixture was held for 3.5 hours and then 222 parts of deionized water were added to produce an amine-solubilized resin product.

EXAMPLE J

Into a reactor equipped as in Example A was charged 308 parts Epon 829, 92 parts Bisphenol A and 160 parts of isooctyl thioglycolate. This mixture was heated about 180° C. for 1 hour, cooled to 150° C. and held for 3 hours. After this time, 120 parts of butyl Cellosolve was added while cooling to 93° C. The ester groups were then saponified with a solution of 44 parts of potassium hydroxide and 44 parts of deionized water by heating for 1 hour at 63° C. The resulting solution was reduced further with 100 parts of deionized water to give a product with a solids content of 56.5 percent and a Gardner-Holdt viscosity of Z-.

EXAMPLE K

In this example, Example J was repeated except that the isooctyl thioglycolate was replaced with 171 parts of isooctyl mercaptopropionate. The resultant product was a hazy solution with a solids content of 55.8 percent and a Gardner-Holdt viscosity of Z-8.

The following examples (I through IV) illustrate various utilizations of reaction products of the invention.

EXAMPLES I–II

In these examples, the reaction products of Examples J and K were formulated into coating compositions by blending therewith a crosslinking agent and cure accelerating catalyst. The compositions had the following formulations:

| INGREDIENTS | PARTS BY WEIGHT | |
|---|---|---|
| | EXAMPLE I | EXAMPLE II |
| Reaction product of Example J | 50.0 | — |
| Reaction product of Example K | — | 50.0 |
| Hexa(methoxymethylol)melamine | 10.0 | 10.0 |
| Cyzac 1010 (catalyst)* | 2.5 | 2.5 |
| Total | 62.5 | 62.5 |

*A 20 percent solution of p-toluenesulfonic acid in isopropyl alcohol available from American Cyanamid Corporation The above compositions were drawn down on Bonderite 40 pretreated steel panels and baked at 350° F. for 20 minutes. The resultant films were smooth and hard and exhibited good reverse impact resistance, failing at 140 inch pounds.

EXAMPLES III–IV

In these examples, coating compositions were formulated by blending the reaction products of Examples J and K with an aqueous acrylic polymer dispersion, crosslinking agent, catalyst and other ingredients. The compositions had the following formulations:

| INGREDIENTS | PARTS BY WEIGHT | |
|---|---|---|
| | EXAMPLE III | EXAMPLE IV |
| Reaction product of Example J | 50.0 | — |
| Reaction product of Example K | — | 50.0 |
| Acrylic polymer dispersion* | 30.0 | 30.0 |
| Hexa(methoxymethylol)-melamine | 30.0 | 30.0 |
| Cyzac 1010 catalyst | 4.0 | 4.0 |
| Dimethylethanolamine | 5.0 | 5.0 |
| Deionized water | 10.0 | 10.0 |
| Total | 129.0 | 129.0 |

*An aqueous based acrylic polymer dispersion having a total solids content of 30 percent by weight and a viscosity of 200 centipoises. The polymer dispersion, having an aqueous medium containing 86 parts by weight of water and 14 parts by weight of organic solvents, was prepared by interpolymerizing in water miscible organic solvents, a monomer mixture consisting of 6 percent acrylic acid, 30 percent styrene, 37 percent butyl acrylate, 17 percent methyl methacrylate, and 10 percent hydroxypropyl acrylate, neutralizing the acid groups of the resultant interpolymer to form the salt of the interpolymer and then dispersing the product in water.

The above compositions as in Examples I–II were drawn down on Bonderite 40 pretreated steel panels and baked at 350° F. for 20 minutes. The resultant films were smooth and slightly softer than in Examples I–II. The films exhibited good solvent resistance and good reverse impact resistances, passing at 140 inch pounds.

As illustrated by Examples I–IV, the reaction products described herein produce useful coatings and additional benefits are obtained when these products are blended with other resins.

In addition to the reaction products used in Examples I–IV any of the other reaction products described (i.e., Examples A-I) can be substituted and similar results obtained. Also, other polymers can be substituted for the acrylic polymer utilized in Examples III and IV. Thus, other aqueous based acrylic polymer dispersions, acrylic lattices, or high molecular weight acrylic polymer lattices may be utilized. For instance, it is possible to obtain advantageous compositions by blending about 50 percent by weight of the reaction products herein with about 50 percent by weight of a high molecular weight acrylic latex polymer. In addition, other crosslinking agents can be substituted for the hexa(methoxymethylol)melamine utilized in Examples I–IV. For example hexamethylolmelamine and ethoxymethoxymethyl melamine, as well as monomeric benzylurea and benzoguanamine may be employed. Further, the compositions may be modified to include other additives such as conventional pigments including titanium dioxide, iron oxide and the like, as well as organic pigments such as phthalocyanine blue and the like to provide for particular decorative coatings.

According to the provisions of the patent statutes, there are described above the invention and what are now considered to be its best embodiments; however, within the scope of the appended claims, it is to be understood that the invention can be practiced otherwise than as specifically described.

We claim:

1. An aqueous composition comprising the solubilized reaction product of:
   A. a polyepoxide containing a 1,2-epoxy equivalency greater then 1.0; and
   B. a compound containing a mercaptan group and at least one group hydrolyzable to a carboxyl group, said compound having the structural formula:

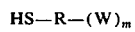
   $$HS-R-(W)_m$$

wherein m is an integer from 1 to 5, R is an organic radical having from 1 to 10 carbon atoms and W is a group hydrolyzable to a carboxyl group.

2. The aqueous composition of claim 1, wherein the equivalent ratio of epoxy groups in the polyepoxide to mercaptan groups in said compound is between 1:0.25 and 1:1.25.

3. The aqeuous composition of claim 2, wherein said equivalent ratio is between 1:0.5 and 1:1.

4. The aqueous composition of claim 1, wherein W is selected from the group consisting of —COOR', —CON(R'')$_2$, and —CN, where R' is an alkyl group of from 1 to 10 carbon atoms and R'' is selected from the group consisting of hydrogen, lower alkyl and mixtures thereof.

5. The aqueous composition of claim 1, wherein said compound is an alkyl ester of mercaptoacetic acid.

6. The aqueous composition of claim 1, wherein said compound is an alkyl ester of α-mercaptopropionic acid or β-mercaptopropionic acid.

7. The aqueous composition of claim 1, wherein said compound is ethyl thioglycolate, n-butyl thioglycolate, isooctyl thioglycolate or isooctyl mercaptoproprionate.

8. The aqueous composition of claim 1, further comprising an active-hydrogen containing material having an average functionality of 2.

9. An aqueous composition comprising the solubilized reaction product of:
   A. a polyepoxide having a 1,2-epoxy equivalency greater than 1.0; and
   B. a compound containing a mercaptan group and an ester group hydrolyzable to a carboxyl group, said compound having the structural formula:

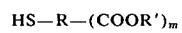
   $$HS-R-(COOR')_m$$

wherein m is 1 to 5, R is an organic radical having from 1 to 10 carbon atoms and R' is an alkyl group having from 1 to 10 carbon atoms.

10. The aqueous composition of claim 9, wherein the equivalent ratio of epoxy groups in the polyepoxide to mercaptan groups in said compound is between 1:0.25 and 1:1.25.

11. The aqueous composition of claim 9, wherein said compound is ethyl thioglycolate, n-butyl thioglycolate, isooctyl thioglycolate or isooctyl mercaptopropionate.

12. A method of preparing an aqueous composition comprising:
  A. reacting a polyepoxide having a 1,2-epoxy equivalency greater than 1.0 with a compound containing a mercapto group and at least one group hydrolyzable to a carboxyl group, said compound having the structural formula:

HS—R—(W)$_m$ wherein m is an integer from 1 to 5, R is an organic radical having from 1 to 10 carbon atoms and wherein W is a group hydrolyzable to a carboxyl group; and B. solubilizing the reaction product.

13. The method of claim 12, wherein the equivalent ratio of 1,2-epoxy groups in the polyepoxide to mercaptan groups in said compound is between about 1:0.25 and 1:1.25.

14. The method of claim 12, wherein W is selected from the group consisting of —COOR', —CON(R")$_2$, and —CN, where R' is an alkyl group of from 1 to 10 carbon atoms and R" is selected from the group consisting of hydrogen, lower alkyl and mixtures thereof.

15. The method of claim 12, wherein said compound is an alkyl ester of mercaptoacetic acid.

16. The method of claim 12, wherein said compound is an alkyl ester of α-mercaptopropionic acid or β-mercaptopropionic acid.

17. The method of claim 12, wherein said compound is n-butyl thioglycolate, ethyl thioglycolate, isooctyl thioglycolate or isooctyl mercaptopropionate.

18. The method of claim 12, wherein said reaction product is solubilized with an aqueous solution of a basic compound selected from the group consisting of alkali metal hydroxides, ammonia, amines, and quaternary ammonium compounds.

19. The method of claim 12, wherein said reaction product is solubilized with an aqueous alkali metal hydroxide solution.

20. The method of claim 12, further comprising the steps of:
  C. reacting an acid with the solubilized reaction product;
  D. filtering off the resultant salt formed; and
  E. reacting its filtrate with an aqueous amine solution.

21. An aqueous composition comprising:
  A. the solubilized product of:
    1. a polyepoxide containing a 1,2-epoxy equivalency greater than 1.0; and
    2. a compound containing a mercaptan group and at least one group hydrolyzable to a carboxyl group, said compound having the structural formula:

HS—R—(W)$_m$ wherein m is an integer for 1 to 5, R is an organic radical having from 1 to 10 carbon atoms and W is a group hydrolyzable to a carboxyl group; and
  B. a curing agent.

22. The aqueous composition of claim 21, wherein the equivalent ratio of epoxy groups in the polyepoxide to mercaptan groups in said compounds is between 1:0.25 and 1:1.25.

23. The aqueous composition of claim 21, wherein W is selected from the group consisting of —COOR', —CON(R")$_2$, and —CN, where R' is an alkyl group of from 1 to 10 carbon atoms and R" is selected from the group consisting of hydrogen, lower alkyl and mixtures thereof.

24. The aqueous composition of claim 21, wherein said compound is an alkyl ester of mercaptoacetic acid or α-mercaptopropionic acid or β-mercaptopropionic acid.

25. The aqueous composition of claim 21, wherein said curing agent is selected from the group consisting of aminoplast resins, phenolic resins and a blocked or semi-blocked polyisocyanate.

26. An aqueous composition comprising:
  A. the solubilized reaction product of:
    2. a polyepoxide having a 1,2-epoxy equivalency greater than 1.0; and
    2. a compound containing a mercaptan group and at least one group hydrolyzable to a carboxyl group, said compound having the structural formula:

HS—R—(W)$_m$ wherein m is an integer from 1 to 5, R is an organic radical having from 1 'to 10 carbon atoms and W is a group hydrolyzable to a carboxyl group; and
  B. a resin selected from the group consisting of phenolic resins, hydrocarbon resins, acrylic polymers, high molecular weight acrylic latex polymers, polyisocyanates, blocked or semi-blocked polyisocyanates and mixtures thereof.

27. The aqueous composition of claim 26 wherein said composition based on the total weight of (A) and (B) contains from about 20 to about 80 percent by weight of (A) and from about 80 to about 20 percent by weight of (B).

28. The aqueous composition of claim 26 wherein said composition further contains pigment.

29. The aqueous composition of claim 26 wherein said resin is a high molecular weight acrylic latex polymer.

30. The aqueous composition of claim 29 wherein said acrylic polymer has a weight average molecular weight of at least about 100,000.

31. A coating composition comprising a liquid medium and a reaction product represented by the structure:

(1) A—CH—CH$_2$—S—R—(COOX)$_m$
         |
         OH or

-continued (2) 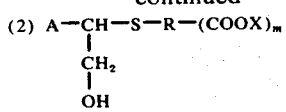

or a mixture of (1) and (2),
wherein A represents the organic radical portion of a polyepoxide resin having a 1,2-epoxy equivalent of greater than 1.0, R is an organic radical having from 1 to 10 carbon atoms, $m$ is an integer from 1 to 5 and X is hydrogen or a moiety formed by reacting the carboxylic group with a basic compound selected from the group consisting of alkali metal hydroxides, ammonia, amines or quaternary ammonium compounds.

32. The coating composition of claim 31 wherein the liquid medium thereof is water, organic solvent or a mixture thereof.

* * * * *